United States Patent [19]

Montieth

[11] 4,337,027
[45] Jun. 29, 1982

[54] INJECTION MOLD VALVE

[76] Inventor: Royel F. Montieth, #958 5440 N. Brasewood, Houston, Tex. 77096

[21] Appl. No.: 175,914

[22] Filed: Aug. 6, 1980

[51] Int. Cl.³ ............................................. B29F 1/05
[52] U.S. Cl. .................................... 425/562; 425/572
[58] Field of Search ........................ 425/560, 562, 572

[56] References Cited
U.S. PATENT DOCUMENTS

| | | | |
|---|---|---|---|
| 3,191,233 | 6/1965 | Linderoth | 425/562 X |
| 3,960,996 | 6/1976 | Balevski | 425/560 X |
| 4,242,073 | 12/1980 | Tsvchiya | 425/562 X |

Primary Examiner—Thomas P. Pavelko
Attorney, Agent, or Firm—Browning, Bushman, Zamecki & Anderson

[57] ABSTRACT

The invention pertains to a valve assembly particularly useful in injection mold apparatus of the type comprising a pair of abutting mold body members having registering cavity portions and channels in their abutting interface surfaces. The valve assembly comprises a generally tubular mounting member and an elongate valve element having a portion mounted within the mounting member for rotation therein and a portion extending axially outwardly from the mounting member. The extending portion of the valve element has an axially directed end face with a recess therein opening axially and radially of the valve element. Detent formations are cooperative between the mounting member and the valve element for retaining the valve element in a desired one of a plurality of positions with respect to the mounting member. A biasing spring cooperative between the mounting member and valve element urges the detent formations into engagement, but is yieldable to permit rotation of the valve element from one to another of its positions upon the application of sufficient torque to the valve element.

15 Claims, 6 Drawing Figures

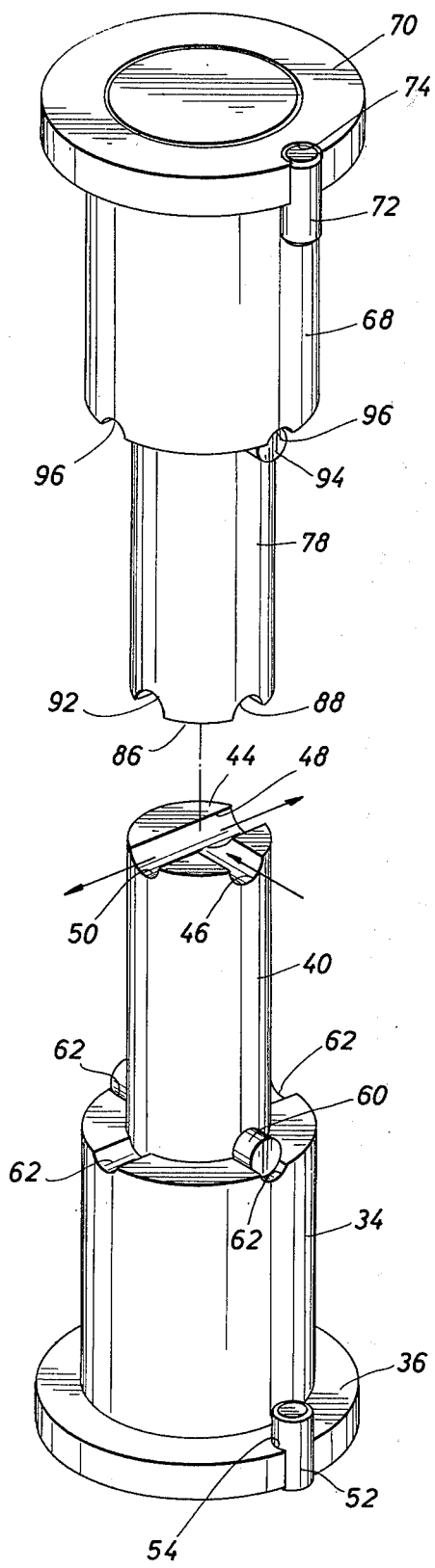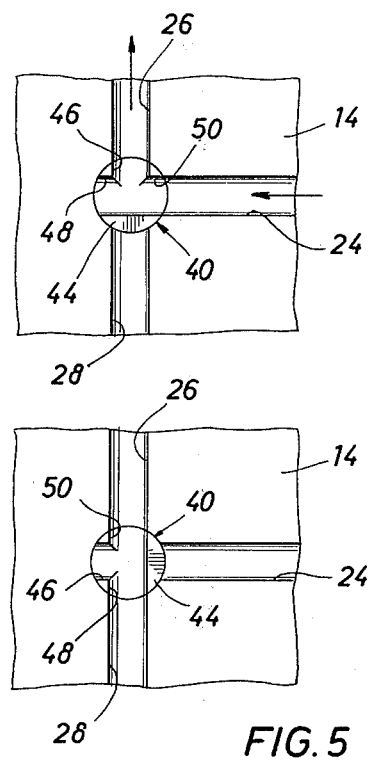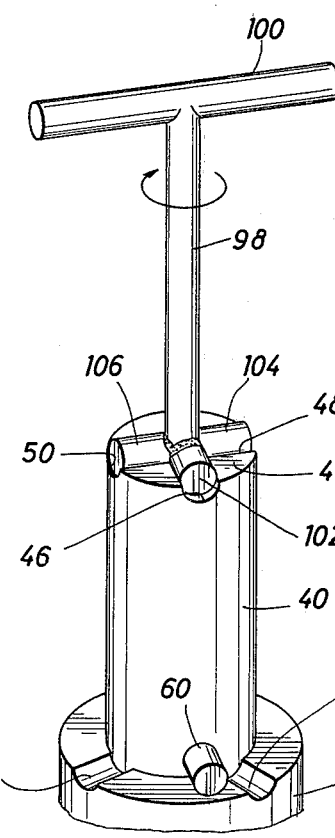

INJECTION MOLD VALVE

BACKGROUND OF THE INVENTION

The invention pertains to a valve assembly which, while useful in many environments, is particularly adapted for use in injection mold apparatus. Such apparatus typically comprises a mold body including first and second body members having respective opposed first and second interface surfaces. The body members are releasably mounted in abutment with each other along the interface surfaces. At least the first of the body members has at least two spaced apart mold cavities disposed at least partially in that body member. These mold cavities are designed for the formation of different elements to be molded. Flowable material is injected into the mold cavities through channels in the interface surface. For example, these channels may include an inlet channel and a pair of branch channels each extending from the inlet channel to a respective one of the mold cavities.

Although the second body member could be simply an abutment member used to close the open sides of the channels, it more typically has formations in its interface surface which register with those of the opposed interface surface of the first body member. Thus, each of the mold cavities may have first and second portions formed in the first and second body members respectively and opening through their interface surfaces so that, when the body members are properly mounted in abutment along the interface surfaces, these cavity portions register with each other to form complete mold cavities. Likewise, the channels of the first body member register with similar channels in the second body member to form generally tubular flowaways, known as "runners," for the molten or flowable material to be molded.

As previously mentioned, each such mold usually includes several cavities for the molding of distinct parts. As also previously mentioned, flowable material may be introduced into these various cavities through a common inlet flowway or "runner" comprising the registered inlet channels of the first and second body members. This allows for simultaneous formation of more than one type of part or article with but a single injection of flowable material. However, in some instances, it may be necessary, to fill a particular order, to mold an unequal number of the various types of parts or articles which the particular mold apparatus is designed to form. In such instances, it is necessary either to waste material by making an equal number of all parts, some of which will then be unused, or to attempt to plug the runner leading to that cavity from which the lesser number of parts is to be formed.

The first of these alternatives is obviously undesirable because it is wasteful. The second is equally undesirable for other reasons. In particular, extensive machining of the mold body member in question is necessary with conventional techniques. Also, the use of conventional "shut offs" or "block offs" requires repeated emplacements, removals and replacements of parts. These two results are not only time consuming and bothersome, but both pose a substantial danger of damage to the smoothly finished interface surfaces and/or the precisely machined channels and mold cavities opening through those interface surfaces.

SUMMARY OF THE INVENTION

The present invention provides a simple but effective valving arrangement which can be easily installed in already existing molds of the conventional type described above. The machining time is drastically reduced, e.g. from 3 to 4 hours to about 1 hour, as compared to the time needed to machine a mold to receive conventional block-offs. Furthermore, once installed, the valve apparatus need never by removed from the mold to place the latter in full multi-cavity production potential. Thus, the simplified machining process, together with the fact that the parts are only installed once and simple moved from one position to another during subsequent operations, drastically reduces the chance of damage to the mold.

More specifically, in accord with the present invention, a first bore is provided in a first of the two body members of the mold, the bore opening through the respective interface surface at the point of intersection of at least two channels so that these channels generally radiate from the bore. These channels may be upstream and downstream portions of what would otherwise be a single continuous branch channel leading to one of the mold cavities, or they may include an inlet channel and one or more branch channels as described above. These will be referred to hereafter as the first branch channels and the first inlet channels since they are located in the first mold body member. Likewise, the cavity portions with which the respective branch channels communicate will be referred to as the first cavity portions. A first valve element is mounted in this bore. The valve element has an end face generally contiguous the respective or first interface surface and facing in the same direction therewith, and this end face has first recess means therein opening axially and radially of the first valve element.

The first valve element is selectively rotatable between a first position in which its recess means is aligned with each of two channels to provide communication therebetween via the first recess means, and a second position in which the first recess means is displaced from alignment with at least one of the channels to block said one channel from communication with the other channel via the first recess means. Where the channels radiating from the first bore in which the first valve element is mounted include a pair of first branch channels and a common first inlet channel for the two, the recess means in its first position is aligned with all three of the first channels to provide communication between the first inlet channel and each of the first branch channels via its recess means. In its second position, the recess means is aligned with the first inlet channel and one of the first branch channels but displaced from alignment with the other of the first branch channels to provide communication between the first inlet channel and said one of the first branch channels but block said other of the first branch channels from communication with the first inlet channel via the first recess means.

In the last-mentioned embodiment, the first valve element is preferably also selectively rotatable to third and fourth positions. The third position permits communication between the inlet channel and said other branch channel while blocking said one branch channel, and the fourth position blocks the inlet channel from communication with either of the branch channels.

Although the second mold body member could be provided with a non-recessed element for abutment with the end face of the first valve element, it is, at least in conventional apparatus in which it includes its own set of mold cavity portions and channels, provided with a second valve element identical to the first and bearing the same relation to the second body member that the first valve element bears to the first body member. The two valve elements are preferably rotatable independently of one another. Thus they can be moved to identical positions for full flow to or complete blockage of mold cavities. Alternatively, only one of the valve elements can be placed in its closed position to produce a throttling effect.

The valve assembly itself, in addition to the aforementioned valve element, preferably also includes a tubular mounting member or bushing surrounding a portion of the valve element distal its end face, the bore in the respective mold body member having an enlarged diameter portion for receiving the mounting member. Detent means are provided cooperative between each valve element and its mounting member for releasably retaining the valve element in a desired one of its positions. Biasing means are provided for urging the detent means into engagement, the biasing means being yieldable to permit rotation of the valve element upon application of sufficient torque.

Accordingly, it is a principal object of the present invention to provide an improved injection mold with a valve assembly.

A further object of the present invention is to provide an improved valve assembly.

Another object of the present invention is to provide such a valve assembly which is easily installed and used without substantial danger of damage to the mold apparatus.

Still another object of the present invention is to provide such a valve assembly which can also be used for throttling the flow through an injection mold.

Yet a further object of the present invention is to provide such a valve assembly which can be easily installed in a pre-existing conventional mold apparatus.

Still other objects, features and advantages of the present invention will be made apparent by the following detailed description in conjunction with the drawings and the claims.

BRIEF DESCRIPTION OF THE DRAWING

FIG. 3 is a perspective view of the valve assemblies of FIGS. 1 and 2.

FIG. 4 is a detailed view showing the valve element in a different position from that of FIG. 2.

FIG. 5 is a view similar to that of FIG. 4 showing the valve element in still another position.

FIG. 6 is a partial perspective view showing a tool which may be used to rotate the valve element.

DESCRIPTION OF THE PREFERRED EMBODIMENT

Figure 1:
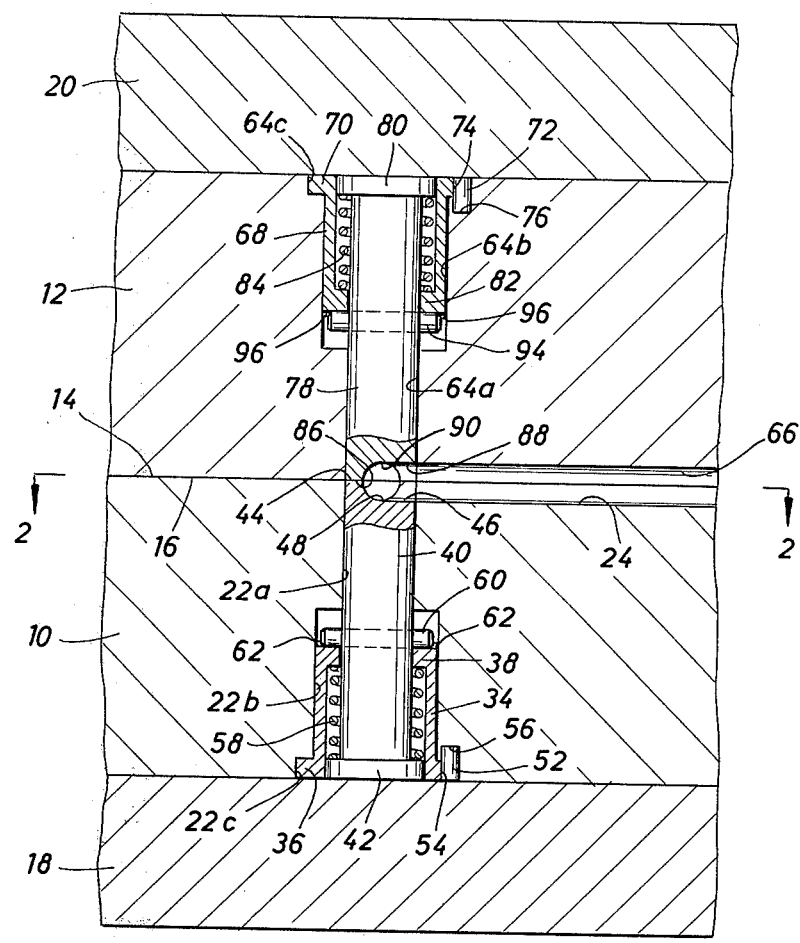
FIG. 1 is a partial cross-sectional view through a mold apparatus in accord with the pesent invention.
Figure 2:
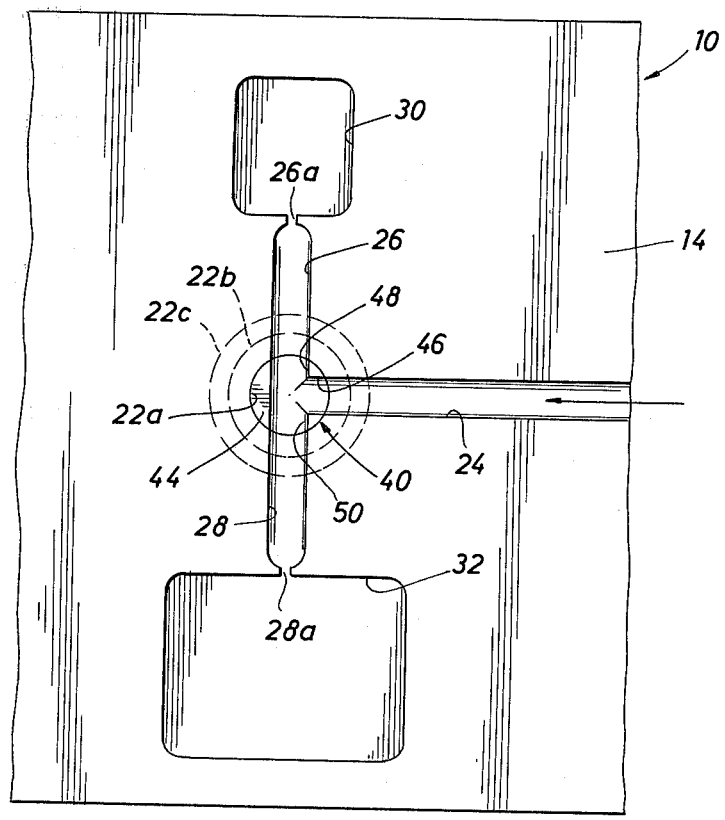
FIG. 2 is a plan view of the interface surface of one mold body member taken along the line 2—2 of FIG. 1.

FIGS. 1 and 2 show an otherwise conventional injection mold apparatus adapted for receipt of valve assemblies according to the present invention. The apparatus includes first and second mold body members 10 and 12 respectively. Members 10 and 12 have respective opposed interface surfaces 14 and 16 and are secured together by outer or housing members 18 and 20, in a manner well known in the art, with interface surfaces 14 and 16 in abutment with each other. As shown, interface surfaces 14 and 16 are generally planar, with the exception of the bores, channels, and cavity portions described below.

First body member 10 has a bore therethrough oriented perpendicular to its respective interface surface 14. This bore includes a relatively small diameter section 22a opening through interface surface 14, a larger diameter section 22b located adjacent section 22a and outwardly thereof, and an even larger diameter counterbore section 22c opening through the outer surface of member 10 opposite interface surface 14.

Interface surface 14 has a plurality of channels formed therein radiating from inner bore section 22a. These include an inlet channel 24 which extends from bore section 22 to a sprue hole (not shown) through which the molten material to be molded is injected. Longitudinally aligned branch channels 26 and 28 extend from bore section 22a in diametrically opposite directions perpendicular to inlet channel 24 so that the channels 24, 26 and 28 define a generally T-shaped pattern.Additional branch channels may be provided at various points along the length of inlet channel 24. However, for simplicity of illustration, such additional channels have not been shown in the drawing. The mold apparatus shown has two mold cavities, one of which has a first portion 30 formed in body member 10 and opening through first interface surface 14. Cavity portion 30 communicates with branch channel 26 through a restricted section 26a at the outer end of channel 26. The other mold cavity has a portion 32 formed in first body member 10 and opening through first interface surface 14. Cavity portion 32 communicates with branch channel 28 through a restriction 28a. Each of the first channels 24, 26 and 28 is generally semi-circular in transverse cross section.

Bore 22a, 22b, 22c is provided for receipt of a first valve assembly according to the present invention. Referring to FIGS. 1–3, this valve assembly includes a generally tubular mounting member or bushing 34 having an annular flange 36 extending radially outwardly from one end (the outer end with respect to body member 10 in use) and an annular flange 38 extending radially inwardly from the other or inner end. A generally cylindrical first valve element 40 is disposed within bushing 34. Valve element 40 has an annular flange 42 extending radially outwardly from one end thereof. The outer diameter of flange 42 is sized for a sliding fit in the inner diameter of bushing 34, and in use, is disposed generally adjacent the outer end of bushing 34, i.e. adjacent the end on which flange 36 is formed. The remainder of valve element 40 has an outer diameter sized for a sliding fit in the inner diameter of flange 38 of bushing 34. The end of valve element 40 opposite flange 42 extends substantially axially beyond bushing 34 in use. This end of valve element 40 has an axially directed end face 44. End face 44 is generally planar except that it has formed therein a generally T-shaped recess comprising inter-communicating grooves 46, 48 and 50 radiating from a common point coincident with the centerline of valve element 40. Each of the recess grooves 46, 48 and 50 has a semi-circular transverse cross-sectional configuration, corresponding to that of channels 24, 26, and 28, and each recess groove opens both axially and radially of valve element 40.

Valve element 40 is rotatable in bushing 34 about its own axis. Thus, when the first valve assembly is mounted in first body member 10, and bushing 34 restrained against rotation in body member 10, valve element 40 is also rotatable with respect to body member 10. Such mounting is accomplished by inserting the first valve assembly through the larger or counterbored end 22c of bore 22a, 22b, 22c in first body member 10. Flange 36 is sized to fit within counterbore 22c and abut the shoulder formed at the juncture of that counterbore and bore section 22b to limit inward movement of bushing 34. A key pin 52 is inserted into a radial slot 54 in flange 36 and also into a recess 56 in body member 10 offset from the centerline of bore 22a, 22b, 22c. Thus, pin 52 prevents rotation of bushing 34 in body member 10. Housing member 18 is then mounted upon the outer extremity of body member 10 in any suitable manner so that it retains the valve assembly and pin 52 in body member 10. A helical compression spring 58 is disposed coaxially between bushing 34 and valve element 40 and bears on flanges 38 and 42 to restrain valve element 40 against inward movement in body member 10.

Valve element 40 is sized so that, when its outer end is properly engaged by housing member 18 as shown in FIG. 1, its inner end face 44 is substantially contiguous interface surface 14. The diameter of valve element 40 is sized for a sliding fit in bore section 22a. Therefore, end face 44 forms a continuation of interface surface 14. When valve element 40 is rotated to the position shown in FIG. 2, recess groove 46 is aligned with channel 24, recess groove 48 is aligned with channel 26, and recess groove 50 is aligned with channel 28. In other words, the recess 46, 48, 50 as a whole is aligned with all three channels 24, 26, and 28, the recess grooves essentially forming continuations of the respective channels with which they are aligned. Thus, channel 24 can communicate with both channels 26 and 28 via the recess 46, 48, 50.

If valve element 40 is rotated 90° counterclockwise from the position of FIG. 2 to the position of FIG. 4, recess groove 50 will be aligned with inlet channel 24, and recess groove 46 will be aligned with branch channel 26. However, the recess 46, 48, 50, as a whole, will be offset from branch channel 28. Thus, the latter branch channel will be blocked from communication with the inlet channel 24 via recess 46, 48, 50, while branch channel 26 will be permitted to communicate with inlet channel 24 via the recess. It can be seen that if valve element 40 were rotated 90° clockwise from the position of FIG. 2, the opposite arrangement would be obtained. More specifically, recess groove 48 would be aligned with inlet channel 24, and recess groove 46 would be aligned with branch channel 28, the recess 46, 48, 50, as a whole, being offset from branch channel 26. Then, inlet channel 24 would be permitted to communicate with branch channel 28 via the recess but blocked from communication with branch channel 26 via the recess. If valve element 40 is rotated 180° in either direction from the position of FIG. 2 to the position of FIG. 5, recess 46, 48, 50 is completely offset from inlet channel 24. Thus, inlet channel 24 is blocked from communication with either of the branch channels 26 or 28 via recess 46, 48, 50.

In order to retain valve element 40 in any desired one of the four positions described above, a detent system is provided cooperative between valve element 40 and bushing 34. More specifically, valve element 40 has a transverse bore snugly receiving a pin 60 whose ends protrude radially outwardly from valve element 40 in diametrically opposite directions to form detent projections. The innermost axially facing surface of bushing 34, comprising flange 38, has a plurality of radial slots 62 formed therein for cooperation with detent pin 60. There are four such slots 62 circumferentially spaced at 90° increments. Pin 60 is circular in transverse cross section. Each slot 62, in transverse cross section, defines a circular arc of generally the same radius as pin 60 but of less than 180°. Thus each slot 62 has a depth less than half the thickness of pin 60. The lengthwise position of pin 60 along valve element 40 is such that, when the protruding detent formations formed by the ends of pin 60 rest in an opposed pair of the slots 62, end face 44 will be substantially aligned with interface surface 14. The position of pin 60 circumferentially with respect to valve element 40, and the positions of slots 62 circumferentially with respect to bore 22a, 22b, 22c are such that, when the ends of pin 60 rest in a pair of the slots 62, the recess 46, 48, 50 will be in one of the aforementioned four positions with respect to channels 24, 26, and 28.

Spring 58 bearing on flanges 42 and 38 of the valve element and bushing respectively urges the ends of pin 60 against the adjacent axially facing surface of bushing 34 and thus into slots 62. However, upon the application of sufficient torque to valve element 40, spring 58 will compress, allowing the ends of pin 60 to ride out of slots 62, thereby permitting rotation of valve element 40 until the ends of pin 60 drop into the next successive pair of slots 62. The fact that slots 62 have a depth less than half the thickness of pin 60 facilitates such action. Also, bore section 22b is sufficiently greater in length than bushing 34 to allow pin 60 to move in and out of slots 62.

The second body member 12 and its respective valve assembly are generally identical to first body member 10 and the first valve assembly described above with exceptions noted below. Briefly, second body member 12 has a bore therethrough perpendicular to the respective interface surface 16 for mounting the second valve assembly. This bore has a relatively small diameter section 64a opening through interface surface 16, a larger diameter section 64b adjoining the outer end of section 64a, and an even larger counterbore section 64c opening through the outer surface of second body member 12 opposite its interface surface 16.

Second interface surface 16 also has three channels formed therein radiating from bore section 64a in a generally T-shaped pattern. These include an inlet channel 66 extending from bore section 64a and a pair of branch channels (not shown) longitudinally aligned with each other and extending from bore section 64a in opposite directions perpendicular to inlet channel 66. One of these branch channels communicates with a portion of a mold cavity (not shown) formed in body member 12 and opening through interface surface 16. The opening of this cavity portion through surface 16 registers with the opening of portion 30 of the same cavity through interface surface 14 of the first body member 10. The other of the two branch channels in second interface surface 16 communicates with a portion of another mold cavity formed in body member 12 and opening through interface surface 16 in register with the opening of cavity portion 32 through first interface surface 14.

Accordingly, when the two body members 10 and 12 are mounted with their interface surfaces 14 and 16 in abutment as shown in FIG. 1, bore 22a, 22b, 22c will be coaxially aligned with bore 64a, 64b, 64c, and each of the channesl 24, 26, and 28 and the cavity portions 30 and 32 will be in register with the corresponding formations in second body member 12. As used herein, the term "register" is intended to denote general alignment but not necessarily identity of size and shape. When applied to the channels and cavity portions of respective mold body members, the term means that the two cavity portions or channels in question are aligned in such a way that they open into each other or communicate with each other. In preferred embodiments, registering channels are in fact also identical in size and shape, while the registering openings of two cavity portions may or may not be identical.

The registering inlet channels 24 and 66 will, together, form an inlet runner or flowway of circular cross section. Branch channel 26 will, with the corresponding channel in interface surface 16 form a branch runner communicating with a mold cavity defined by cavity portion 30 and the corresponding cavity portion in body member 12, and channel 28 will, together with the corresponding channel in interface surface 16, form another branch runner communicating with a mold cavity defined by cavity portion 32 and the corresponding cavity portion in body member 12.

The second valve assembly, mounted in bore 64a, 64b, 64c, is identical to the first valve assembly described above. This valve assembly includes a generally tubular mounting member or bushing 68. Bushing 68 has an annular flange 70 extending radially outwardly at one end thereof. Flange 70 is sized to be received in counterbore section 64c and abut the shoulder formed between the counterbore and the adjacent bore section 64b which receives the major portion of bushing 68. A key pin 72 is inserted in a radial slot 74 in flange 70 and a recess 76 in body member 12 offset from the centerline of bore 64a, 64b, 64c to prevent rotation of bushing 68 in body member 12. Bushing 68 slidably receives an elongate valve element 78 having an annular flange 80 extending radially outwardly at its outer end and sized for a sliding fit on the inner diameter of bushing 68. The remainder of valve element 78 has its outer diameter sized for a sliding fit in the inner diameter of an annular flange 82 extending radially inwardly from the inner end of bushing 68. A helical compression spring 84 is disposed coaxially between valve element 78 and bushing 68 and bears on flanges 82 and 80 to bias element 78 outwardly with respect to the mold apparatus as viewed in FIG. 1.

The end of valve element 78 distal flange 80 has a planar end face 86 having a T-shaped recess therein identical to recess 46, 48, 50 of the first valve element 40. The recess in second valve element 78 is comprised of three inter-communicating grooves 88, 90, and 92 each opening axially and radially of valve element 78 and having a semi-circular cross-sectional configuration corresponding to those of the channels in interface surface 16. The length of valve element 78 is such that, when the valve assembly is properly mounted in body member 12 with housing member 20 abutting the outer end of bushing 68 and valve element 78, end face 86 will be generally contiguous interface surface 16. The outer diameter of valve element 78 is sized for a sliding fit in bore section 64a.

Valve element 78 can be rotated about its own axis in bushing 68 and body member 12 to four different positions, in each of which the T-shaped recess 88, 90, 92 in end face 86 bears the same relation to the channels in interface surface 16 as does recess 46, 48, 50 of first valve element 40 to the channels in interface surface 14 in a respective one of the four positions of valve element 40. More specifically, valve element 78 may assume a first position, shown in FIG. 1, in which recess groove 88 is aligned with inlet channel 66, and each of the recess grooves 90 and 92 is aligned with a respective one of the branch channels (not shown) in interface surface 16. In a second position of valve element 78, recess groove 92 will be aligned with inlet channel 66, recess groove 88 will be aligned with one of the branch channels, and the recess as a whole will be offset from the other of the branch channels. In a third position, recess groove 90 will be aligned with inlet channel 66, recess groove 88 will be aligned with said other branch channel, and the recess as a whole will be offset from said one branch channel. Finally, in a fourth position, the recess as a whole will be offset from inlet channel 66.

In order to retain valve element 78 in the desired one of the aforementioned four positions, a pin 94 is snugly mounted in a bore extending transversely through valve element 78 so that its ends extend radially outwardly from valve element 78 in diametrically opposite directions to form a pair of detent projections. The inner end surface of bushing 68 is provided with four symmetrically circumferentially spaced slots 96 for receipt of and cooperation with the ends of pins 94. Each of the slots 96 defines a circular arc sized to snugly receive the ends of pins 94, but of less than 180°, whereby the depth of slots 96 is less than half the thickness of pin 94. This allows the ends of pin 94 to more easily ride out of slots 96, overcoming the bias of spring 84, when a sufficient torque is applied to valve element 78. The length of bore section 64b is sufficient to permit such movement of pin 94 without removal of the valve assembly from body member 12.

By placing both valve elements 40 and 78 in positions such that their T-shaped recesses bear analogous relationships to the channels in the respective interface surfaces, inlet runner 24, 66 can be communicated with or blocked from either one or both of the mold cavities. In the case of communication with the mold cavities, when the two valve elements are in such analogous positions, i.e. with their T-shaped recesses in register with each other, the flowway provided by such registered recesses will be equivalent to the full bore of inlet runner 24, 66. For a throttling effect, one of the two valve elements 40 or 78 can be placed in its fourth position, i.e. that position in which its recess is offset from the respective inlet channel 24 or 66, with the other of the two valve elements being placed in whichever one of its four positions is proper to achieve the desired flow to one or the other or both of the mold cavities.

It can be seen that the bores 22a, 22b, 22c and 64a, 64b, 64c are straight cylindrical bores which are relatively easy to form. Other than the machining of these bores, the only modification of a conventional mold apparatus to permit it to receive valve assemblies according to the invention is the formation of the two small recesses 56 and 76 for receiving keys 52 and 72. The simplicity of the operations required to adapt a mold apparatus for receipt of valve assemblies according to the invention is therefore relatively simple, quick, and inexpensive. Furthermore, once the valve assemblies have been properly installed, they need not be removed in order to alter the flow patterns through the mold apparatus. On the contrary, it is only necessary to separate body members 10 and 12 and rotate each valve element 40 or 78 to the desired position.

The last mentioned step can be accomplished, without removal of any part of the valve assembly from the respective mold body member, by using a tool such as that shown in FIG. 6. This tool includes a shaft 98 having a handle 100 at one end. At the other end, is a T-shaped formation comprised of three dowels 102, 104, and 106 sized to fit within the T-shaped recess 46, 48, 50 or 88, 90, 92. It can be seen that the T-shaped formation 102, 104, 106 will act as a wrench in cooperation with such a T-shaped formation in a valve element for transmitting torque thereto. After each valve element 40 or 78 has been thus rotated to the desired position, the body members 10 and 12 are then reassembled. The simplicity of installation and operation of these valve assemblies not only reduces the time required for initial installation and subsequent positional changes, but also minimizes the danger of damage to the precisely machined interface surfaces, channels, and mold cavity openings.

As mentioned, it is unnecessary to remove the valve assemblies from the mold body members for ordinary operation. However, because the large ends 22c and 64c of the valve-receiving bores open through the outer surfaces of the body members 10 and 12, the valve assemblies can be removed, e.g. for service or replacement, by simply removing the housing members 18 and 20.

While the foregoing describes one preferred embodiment of the invention, numerous modifications may be made within the spirit of the invention. By way of example only, in the embodiment shown, the recess in each valve element includes a plurality of recess grooves radiating from a common point coincident with the longitudinal centerline of the valve element. In other embodiments, the recess could have other configurations; for example, it could be sector-shaped as the end face of the respective valve element is viewed in plan. The shape of the recess could also be modified to accommodate apparatus having more than two branch channels and/or in which the branch channels are disposed at non-perpendicular angles to the inlet channel.

It should likewise be noted that a valve assembly in accord with the present invention could be located in various other positions with respect to a pattern of channels in a mold body member, depending upon the result desired, and the recess means in the valve element would be configured accordingly. For example, rather than being located at the juncture point of an inlet channel and two or more branch channels, the assembly could be located at a desired point along the length of the inlet channels so that it could be used to admit flow to or block flow from all mold cavities downstream thereof. Such a valve assembly could also be located at a desired point along the length of a branch channel to permit flow to or block flow from the respective individual mold cavity. Also, while the preferred embodiment discloses two identical valve assemblies in the abutting mold body members, it would be possible to provide such a valve assembly in only one body member, with the other body member being provided with a non-recessed formation for closing the axially open sides of the recess in the one valve element. Still other variations will suggest themselves to those of skill in the art. Accordingly, it is intended that the scope of the invention be limited only by the claims which follow.

I claim:

1. An injection mold apparatus comprising:
   a mold body comprising first and second integral body members having respective opposed first and second interface surfaces, said body members being releasably mounted in abutment with each other along said interface surfaces;
   said first body member having
   a first bore opening through said first interface surface, and
   at least two concavities in and opening through said first interface surface generally radiating from said first bore,
   and a first valve element mounted in said first bore having an end face generally contiguous said first interface surface and facing in the same direction therewith, said first valve element having first recess means in said end face opening radially of said first valve element, as well as axially through said end face, said first valve element being selectively rotatable between a first position in which said first recess means is aligned with both of said concavities to provide communication therebetween via said first recess means, and a second position in which said first recess means is displaced from alignment with at least one of said concavities to block said one concavity from communication with the other of said said concavities via said first recess means.

2. The apparatus of claim 1 wherein said first body member further has a pair of spaced apart mold cavities disposed at least partially therein, and three such concavities including a first inlet channel and a pair of first branch channels, all generally radiating from said first bore, one of said first branch channels communicating with one of said mold cavities and the other of said first branch channels communicating with the other of said mold cavities; said recess means in said first position being aligned with all three of said first channels to provide communication between said first inlet channel and each of said first branch channels via said first recess means, and, in said second position, being aligned with said first inlet channel and said one of said first branch channels but displaced from alignment with said other of said first branch channels to provide communication between said first inlet channel and said one of said first branch channels but block said other of said first branch channels from communication with said first inlet channel via said first recess means.

3. The apparatus of claim 2 wherein said first valve element is further selectively rotatable to a third position in which said first recess means is aligned with said first inlet channel and said other of said first branch channels but displaced from alignment with said one of said first branch channels to provide communication between said first inlet channel and said other of said first branch channels but block said one of said first branch channels from communication with said first inlet channel via said first recess means.

4. The apparatus of claim 3 wherein said first valve element is further selectively rotatable to a fourth position in which said first recess means is displaced from alignment with said first inlet channel to block said first inlet channel from communication with either of said first branch channels via said first recess means.

5. The apparatus of claim 4 wherein said first valve element is generally cylindrical and is rotatable between said first, second, third and fourth positions about its own axis, said axis being generally perpendicular to said first interface surface.

6. The apparatus of claim 5 wherein each of said mold cavities has a respective first portion disposed in said first body member and opening through said first interface surface;

said second body member having
second portions of said mold cavities disposed therein and opening though said second interface surface, each of said second portions of said mold cavities registering with a respective one of said first portions,
a second bore opening through said second interface surface in register with said first bore, and
a second inlet channel and a pair of second branch channels in said second interface surface generally radiating from said second bore, said second inlet channel registering with said first inlet channel, one of said second branch channels registering with said one of said first branch channels, and communicating with one of said second mold cavity portions, and the other of said second branch channels registering with said other of said first branch channels and communicating with the other of said second mold cavity portions;
and further comprising a cylindrical second valve element mounted in said second bore and having an end face generally contiguous said second interface surface and facing in the same direction therewith, said second valve element having second recess means in its end face opening axially and radially of said second valve element and of approximately identical size and shape as said first recess means, said second valve element being selectively rotatable about its own axis between first, second, third and fourth positions in each of which said second recess means bears the same relation to said second channels as does said first recess means with respect to said first channels in a respective one of said positions of said first valve element.

7. The apparatus of claim 6 wherein each of said valve elements is rotatable independently of the other.

8. The apparatus of claim 7 wherein each of said recess means comprises three grooves in said end face of the respective valve member radiating from a common point in communication with one another and disposed in the same angular relation to one another as the channels of the respective body member.

9. The apparatus of claim 8 wherein each of said recess means is generally T-shaped, two of said grooves being longitudinally aligned in end-to-end relation, and the third of said grooves being generally perpendicular to said longitudinally aligned grooves.

10. The apparatus of claim 9 wherein said channels and said grooves are of approximately equal widths.

11. The apparatus of claim 1 further comprising first detent means associated with said first valve element for retaining said valve element in a desired one of its positions, and biasing means for urging said detent means into engagement, but yieldable to permit rotation of said valve element upon the application of sufficient torque thereto.

12. The apparatus of claim 11 wherein said valve element has a tubular mounting member surrounding a portion of said valve element distal said end face, said first bore having an enlarged diameter portion for receiving said mounting member.

13. The apparatus of claim 12 wherein said first bore opens outwardly through an outer surface of said first body member for removal of said valve element and said mounting member.

14. The apparatus of claim 12 wherein said detent means comprises at least one detent projection extending radially outwardly from said valve element, said mounting member having a generally axially facing surface disposed adjacent said detent projection, and said detent means further comprising a series of circumferentially spaced, generally radially extending slots in said axially facing surface of said mounting member for receiving said detent projection, and wherein said biasing means comprises spring means cooperative between said valve element and said mounting member.

15. The apparatus of claim 14 wherein said detent projection, in transverse cross section, has a curved surface for engagement in said slots, said slots being correspondingly curved and having a depth less than half the thickness of said detent projection.

* * * * *